United States Patent [19]

Maruyama

[11] Patent Number: 5,243,314
[45] Date of Patent: Sep. 7, 1993

[54] MAGNETIC HOLDING DEVICE

[75] Inventor: Masaaki Maruyama, Nagano, Japan

[73] Assignee: Kanetec Kabushiki Kaisha, Ueda, Japan

[21] Appl. No.: 775,049

[22] Filed: Oct. 11, 1991

[51] Int. Cl.⁵ .............................................. H01F 7/20
[52] U.S. Cl. ....................................... 335/285; 269/8
[58] Field of Search ............................... 335/177–179, 335/285; 269/8

[56] References Cited

U.S. PATENT DOCUMENTS

| | | | |
|---|---|---|---|
| 4,237,439 | 12/1980 | Nemoto | 335/179 |
| 4,471,331 | 9/1984 | Wyatt | 335/286 |
| 4,652,845 | 3/1987 | Finkle | 335/285 |
| 4,676,161 | 6/1987 | Peekna | 335/285 |
| 4,931,758 | 6/1990 | Bagalini | 335/179 |
| 5,066,936 | 11/1991 | Hsu | 335/295 |

FOREIGN PATENT DOCUMENTS

| | | |
|---|---|---|
| 0345554 | 12/1989 | European Pat. Off. |
| 528196 | 9/1974 | Japan |
| 2-261791 | 1/1990 | Japan |

OTHER PUBLICATIONS

Soviet Inventions Illustrated, Sep. 2, 1975, Section PQ, Week W30, p. 10, 448081.

Patent Abstracts of Japan, Dec. 6, 1985, vol. 9, No. 310, (E-364) (2033) 60-144914 (A).
Patent Abstracts of Japan, Dec. 12, 1985, vol. 9, No. 316 (M-438) (2039) 60-150930 (A).

*Primary Examiner*—Lincoln Donovan
*Attorney, Agent, or Firm*—Stoel Rives Boley Jones & Grey

[57] ABSTRACT

A magnetic holding device is provided that includes at least one electromagnet assembly for selectively switching a holding portion for a magnetic substance into an excited state or an unexcited state; and a permanent magnet for selectively keeping the holding portion in an excited state or an unexcited state in cooperation with the electromagnet assembly. The at electromagnet assembly has a housing provided with a cylindrical portion and a yoke portion disposed at one end of the cylindrical portion and magnetically connected to the cylindrical portion; a magnetic cavity acting as a magnetic leakage path of a magnetic flux from the permanent magnet when the holding portion is maintained in an unexcited state; an iron core disposed in the housing; an exciting coil for generating a magnetic field that acts on the iron core and selectively switches the holding portion into an excited state or an unexcited state in cooperation with the permanent magnet; and adjustment means for adjusting the size of the magnetic cavity.

13 Claims, 10 Drawing Sheets

5,243,314

MAGNETIC HOLDING DEVICE

BACKGROUND OF THE INVENTION

1. Field of the Invention

This invention relates to a magnetic holding device for holding and releasing a magnetic substance. More specifically, the inventive magnetic holding devices include a permanent magnet and an exciting coil.

2. Description of the Prior Art

A prior art magnetic holding device employing a permanent magnet and an exciting coil keeps a holding portion in an excited state through the action of the magnetic flux of the permanent magnet when holding the magnetic substance. The holding portion is kept in an unexcited state through the action of the exciting coil in generating a the magnetic field to prevent the magnetic flux of the permanent magnet from acting on the holding portion when the magnetic substance is to be released.

In this known magnetic holding device, the magnetic flux from the permanent magnet is allowed to pass through a magnetic cavity acting as a magnetic leakage path by a magnetic field generated by the exciting coil while the holding portion is maintained in an unexcited state, but this magnetic flux is prevented from passing through the holding portion.

As a result of the variance in the magnetic properties of materials used and the processing accuracy of parts, the holding portion of this prior art magnetic holding device cannot be kept in a completely unexcited state.

SUMMARY OF THE INVENTION

An object of the present invention is to provide a magnetic holding device which can adjust a magnetic cavity to keep a holding portion in a completely unexcited state regardless of the variance in the magnetic properties of materials and the processing accuracy of parts.

A magnetic holding device according to the present invention includes at least one electromagnet assembly for selectively switching a magnetic substance holding portion into an excited state or an unexcited state, respectively; and a permanent magnet for selectively keeping the holding portion in the excited or unexcited state through cooperation with at least one electromagnet assembly.

In magnetic holding devices of the present invention, at least one of the electromagnet assemblies has a housing provided with a cylindrical portion and a yoke portion placed at one end of the cylindrical portion and magnetically connected to the cylindrical portion; a magnetic cavity acting as a magnetic leakage path for the magnetic flux from the permanent magnet while the holding portion is maintained in an unexcited state; an iron core disposed in the housing; an exciting coil for generating a magnetic field that acts on said iron core in cooperation with the permanent magnet and selectively switches the holding portion into an excited state and an unexcited state and adjustment means for adjusting the size of the magnetic cavity.

When the size of the magnetic cavity is varied, magnetic resistance value of the magnetic cavity varies, and the quantity of the magnetic flux passing through the magnetic cavity varies. According to the present invention, the holding portion can be kept in a completely unexcited state by adjusting the size of the magnetic cavity.

The magnetic cavity size adjustment may be done after the device is assembled. Alternatively, such size adjustment may be done at assembly of the device precluding post assembly magnetic cavity size adjustments.

Either the yoke portion or the iron core may be located closer to and further from the other component by the adjustment means, thereby defining the magnetic cavity between the yoke portion and the iron core and adjusting the magnetic cavity size. The size of the magnetic cavity can be adjusted by this procedure either at or after assembly of the device.

The yoke portion may be disposed displaceably to the cylindrical portion and the iron core, and the iron core may be disposed indisplaceably with respect to the cylindrical portion. Alternatively, the iron core may be disposed displaceably with respect to the cylindrical portion and the yoke portion, and the yoke portion may be disposed indisplaceably with respect to the cylindrical portion.

The holding portion may be defined by the cylindrical portion and the iron core, and the permanent magnet may be disposed between the cylindrical portion and the iron core. Alternatively, the holding portion may be defined by the cylindrical portion and the yoke portion, and the permanent magnet may be disposed between the cylindrical portion and the yoke portion.

Optionally, a face plate defining the holding portion may be included. In addition, a plurality of electromagnet assemblies may be magnetically and commonly connected to the face plate defining the holding portion. In both cases, the permanent magnet may be provided to the face plate or the electromagnet assemblies.

According to the magnetic holding device embodiment, in which a plurality of electromagnet assemblies are magnetically and commonly connected to one face plate, a number of electromagnet assemblies with the same size in each portion are preliminarily prepared. The magnetic holding device may therefore be assembled using the appropriate number of the electromagnet assemblies as determined by the size of the face plate from the prepared electromagnet assemblies. Since the electromagnet assemblies are standarized and storable, the the magnetic holding device manufacturing time is shortened.

The yoke portion may be provided with a first yoke magnetically connected to the housing and a second yoke arranged in the housing. In this case, it is preferable that the second yoke and the iron core, the first yoke and the iron core, the first yoke and the second yoke or the cylindrical portion and the second yoke cooperate to form the magnetic cavity. The magnetic cavity size adjustment may be performed at assembly or after assembly of the device.

The adjustment means may include a plurality of screws passing through one of two members forming the magnetic cavity and screwed in the other and/or a plurality of screws screwed in one of two members forming the magnetic cavity and brought into contact with the other. In both cases, non-magnetic material may be disposed in the magnetic cavity. In this manner, the size of the magnetic cavity is maintained accurately and easily.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF PREFERRED EMBODIMENTS

FIG. 1 through FIG. 8 show preferred embodiments of a magnetic holding device capable of adjusting the size of a magnetic cavity after assembly of the device.

Figure 1:
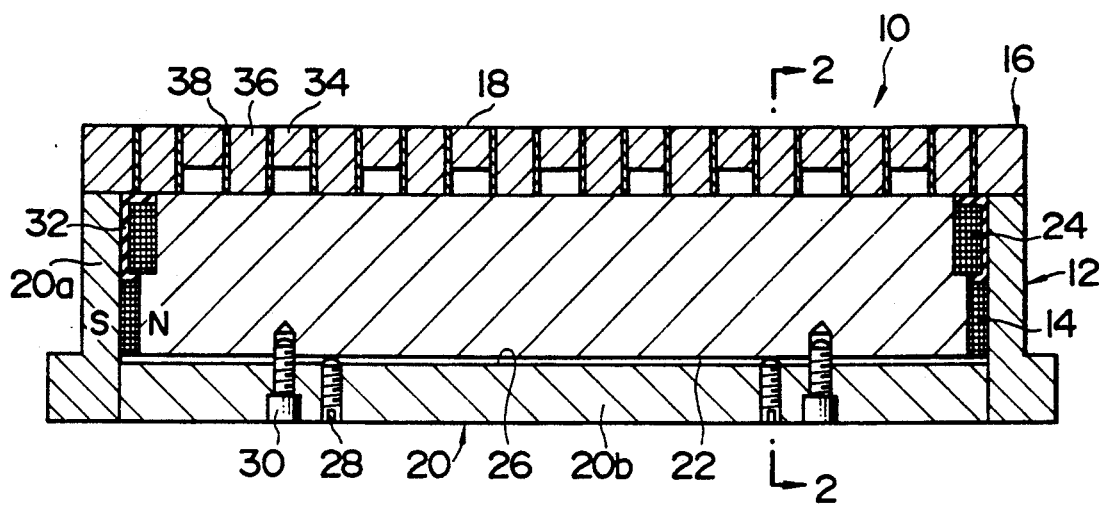
FIG. 1 is a sectional view of a preferred embodiment of a magnetic holding device according to the present invention.
Figure 2:
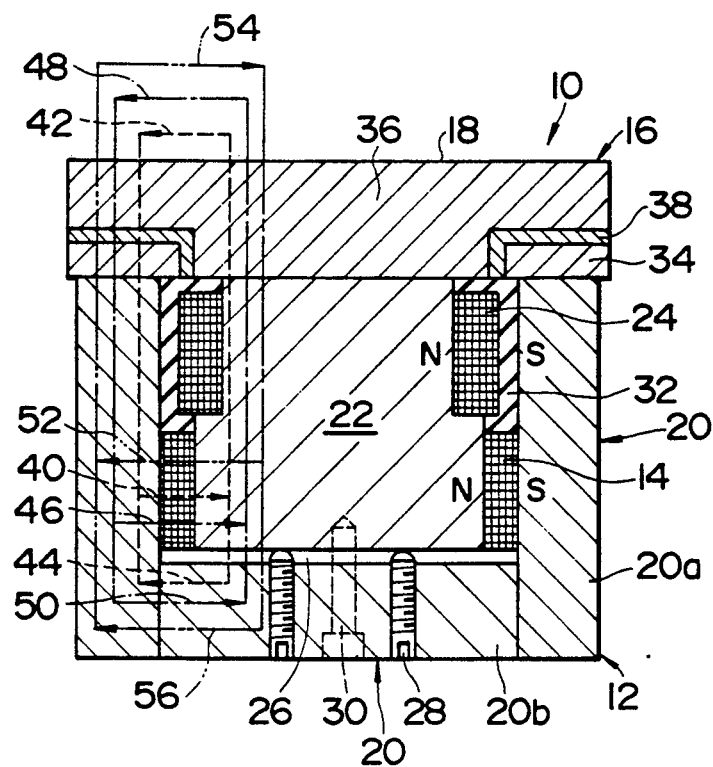
FIG. 2 is an enlarged sectional view taken along the line 2—2 of FIG. 1.

Referring to FIGS. 1 and 2, a magnetic holding device 10 comprises an electromagnet assembly 12; a plurality of permanent magnets 14 arranged in the electromagnet assembly; and a face plate 16. A magnetic substance is held on a holding surface 18 of the face place 16, when the holding surface 18 is kept in an excited state by cooperative action between the electromagnet assembly 12 and the permanent magnet 14. The magnetic substance is released from the holding surface 18 when the holding surface is maintained in an unexcited state.

The electromagnet assembly 12 includes an electromagnet disposed in a box-like housing 20 opened at one end and provided with an iron core 22 made of a ferromagnetic material as well as an exciting coil 24 surrounding the iron core.

The housing 20 is provided with a quadrangle cylindrical portion 20a made of a ferromagnetic material and a plate-like yoke portion 20b made of a ferromagnetic material and movably fitted to the other end of the cylindrical portion 20a permitting motion in the axial direction of the cylindrical portion 20a. The yoke portion 20b is magnetically connected to the cylindrical portion 20a and disposed to close the other end of the cylindrical portion 20a.

The iron core 22 is provided with a rod-like main body and a flange portion attached to the periphery of a lower end portion of the main body. The iron core 22 is disposed so that the axial direction of the flange portion may become the same as the axial direction of the housing 20, and a magnetic cavity 26 may be formed between the lower end of the iron core 22 and the yoke portion 20b of the housing 20. The exciting coil 24 is disposed around the main body of the iron core 22.

The size of the magnetic cavity 26 can be adjusted by a plurality of screws 28 used as a stopper and screwed in the yoke portion 20b of the housing 20, and a plurality of screws 30 used in maintaining the cavity and screwed in the iron core 22. The screws 28 and 30 are made of non-magnetic material and pass through the yoke portion 20b of the housing 20 in the thickness direction thereof.

The permanent magnet 14 is made of a permanent magnet material with high coercivity such as a ferrite magnet or a rear earth magnet. The permanent magnet 14 is disposed between the cylindrical portion 20a of the housing 20 and the flange portion of the iron core 22. The permanent magnet 14 is magnetized in the direction perpendicular to the axis of the housing 20. For example, the permanent magnet 14 may be magnetized as illustrated in FIG. 2 with the side of the housing 20 as S and that of the iron core 22 as N, but the permanent magnet 14 may be magnetized oppositely. The magnetic pole face of the permanent magnet 14 is in contact with both the yoke portion 20b of the housing 20 and the iron core 22.

The relative position of the cylindrical portion 20a of the housing 20, the iron core 22, the permanent magnet 14 and the exciting coil 24 is maintained by using a synthetic resin 32 to fill in the internal space of the housing 20 except in the magnetic cavity 26. The relative position of the cylindrical portion 20a of the housing 20, the iron core 22, the permanent magnet 14 and the exciting coil 24 may be maintained by alternative means such as screws, however.

The face plate 16 is provided with a plurality of elongate first and second pole pieces 34, 36 that are placed alternately and in a parallel relationship and a spacer 38 made of non-magnetic material and placed between adjacent first and second pole pieces 34, 36.

The face plate 16 is affixed to the housing 20 through a plurality of bolts (not shown). Each first pole piece 34 is magnetically connected to the cylindrical portion 20a of the housing 20 at both ends in the longitudinal direction, but it is magnetically insulated from the iron core 22. On the other hand, each second pole piece 36 is magnetically connected to the iron core 22 at the central portion, but it is also magnetically insulated from the cylindrical portion 20a of the housing 20.

Each first pole piece 34 is actually brought into contact with a pair of wall portions corresponding to the cylindrical portion 20a. For this reason, the other pair of wall portions corresponding to the cylindrical portion 20a may be made of non-magnetic material.

The holding surface 18 which holds the magnetic substance is defined by the first and second pole pieces 34, 36 and the spacer 38.

The magnetic flux of the permanent magnet 14 passes in the direction shown by dotted arrow lines 40, 42 and 44 in FIG. 2, when an exciting current is not supplied to the exciting coil 24. A magnetic flux 40 is the total flux of the permanent magnet 14 in the illustrated condition. The magnetic fluxes 40, 42 and 44 are related as follows:

$$A40 = A42 + A44,$$

wherein the respective magnetic flux quantities are defined as A40, A42 and A44.

The magnetic flux 40 of the permanent magnet 14 enters the iron core 22 from the N pole of the permanent magnet 14 and is divided into the magnetic fluxes 42 and 44. The magnetic flux 42 passes through the iron core 22, the face plate 16, the holding surface 18, the face plate 16 and the cylindrical portion 20a, meets with the magnetic flux 44 at the cylindrical portion 20a and returns to the S pole of the permanent magnet 14. The magnetic flux 44 is a magnetic leakage flux passing through the iron core 22, the magnetic cavity 26, and the yoke portion 20b and the cylindrical portion 20a of the housing 20, and does not pass through the magnetic substance. Therefore, the holding surface 18 is maintained in a weakly excited state by the magnetic flux 42.

The first exciting current is supplied to the exciting coil 24, when the holding surface 18 is maintained in an excited state. For this reason, the magnetic fluxes 46, 48 and 50 shown by one point-dotted arrow lines in FIG. 2 are generated by the exciting coil 24. The quantities of the magnetic fluxes 46, 48 and 50 are related as follows:

$$B48 = B46 + B50,$$

wherein respective magnetic flux quantities are defined as B46, B48 and B50.

The magnetic flux passing through the magnetic cavity 26 is a synthesized magnetic flux of the magnetic flux 44 generated by the permanent magnet 14 and the magnetic flux 50 generated by the exciting coil 24. Since the magnetic fluxes 44, 50 are opposite in direction and of equal absolute value, they are mutually prevented from passing through the magnetic cavity 26.

On the other hand, the magnetic flux passing through the holding, surface 18 is the magnetic fluxes 42, 46 generated by the permanent magnet 14 and the exciting coil 24, respectively. Since the direction of the magnetic fluxes 42, 48 is the same, the sum of the magnetic fluxes 42, 48 passes through the holding surface 18. For this reason, the holding surface 18 is maintained in a strongly excited state, and the magnetic substance is held firmly on the holding surface 18.

When the holding surface 18 is maintained in an unexcited state, a second exciting current with a polarity opposite to that of the first exciting current is supplied to the exciting coil 24. Thereafter, the magnetic fluxes 52, 54 and 56 shown by two point dotted lines in FIG. 2 are generated by the exciting coil 24. The directions of the magnetic fluxes 52, 54 and 56 are opposite to those of the magnetic fluxes 46, 48 and 50 shown by one point dotted lines in FIG. 2, respectively. The magnetic fluxes 52, 54 and 56 are related as follows:

$$C54 = C52 + C56,$$

wherein the respective magnetic flux quantities are defined as C52, C54 and C56.

The magnetic fluxes passing through the iron core 22, the face plate 16, the holding surface 18, the face plate 16 and the cylindrical portion 20a of the housing 20 are the magnetic flux 42 generated by the permanent magnet 14 and the magnetic, flux 54 generated by the exciting coil 24, respectively. The magnetic fluxes 42, 54 have opposite directions and other and their quantities have equal absolute values. For this reason, the holding surface 18 is maintain in an unexcited state, and the magnetic substance is absolutely released from the holding surface 18.

The magnetic flux from the permanent magnet 14 is prevented from passing through the magnetic cavity 26 when the holding surface 18 is maintain in an excited state. However, this magnetic flux is prevented from passing through the holding surface 18 when the holding surface is kept in an unexcited state.

According to the magnetic holding device 10, magnetic leakage flux passing through the magnetic cavity 26 when the holding surface 18 is maintained in an excited state can therefore be eliminated, and it is possible to make the magnetic resistance of the magnetic cavity 26 small. It is also possible to lessen the built-in quantity of the permanent magnet 14 into the device and the magnetomotive force generated by the exciting coil 24. As a result, the exciting current of the exciting coil 24 can be lessened.

In the magnetic holding, device 10, the size of the magnetic cavity 26 may be adjusted by displacing the yoke portion 20b of the housing 20 relative to the iron core 22 through the screws 28, 30. The magnetic resistance value of the magnetic cavity 26 varies with the size thereof. As a result, the quantity of the magnetic flux at the holding surface 18 and the quantity of the magnetic flux passing through the magnetic cavity 26 vary, respectively.

Therefore, according to the magnetic holding device 10, the size of the magnetic cavity 26 may be adjusted by the screws 28, 30 to maintain the holding surface 18 in a perfectly unexcited state, when such is desireable. The size of the magnetic cavity 26 may be adjusted either by a manufacturer at assembly or by a user after assembly.

The yoke portion 20b is mounted detachably on the cylindrical portion 20a by a plurality of bolts or the like after the magnetic cavity 26 is adjusted.

As adjustment means of adjusting the magnetic cavity 26, the screw 30 alone may be used. If the screw 28 is also used, however, the yoke portion 20b may be pressed against the screw 28 by the screw 30. Therefore, the magnetic cavity 26 can be maintained constant.

Figure 3:
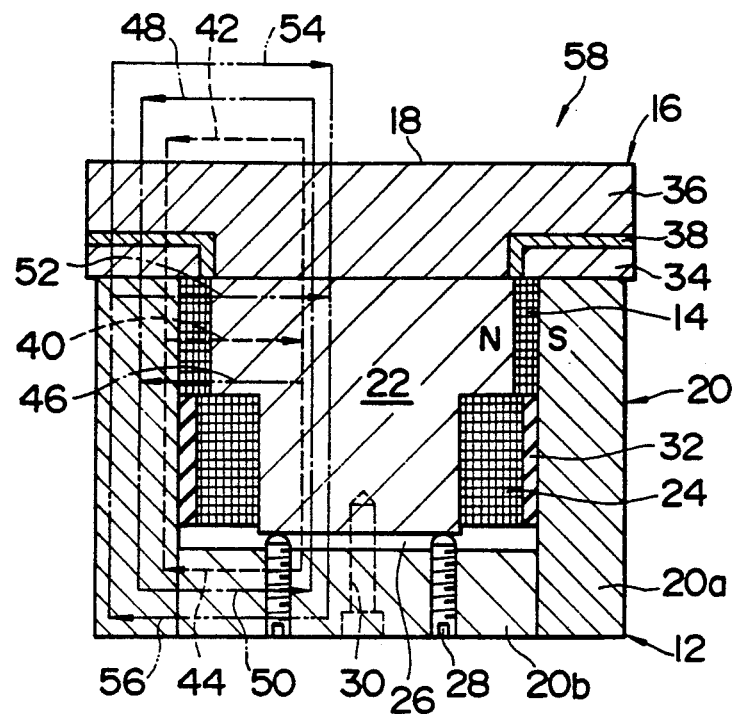
FIGS. 3, 4 and 5 are enlarged sectional views similar to FIG. 2, which shows other embodiments of the magnetic holding device.
Figure 4:
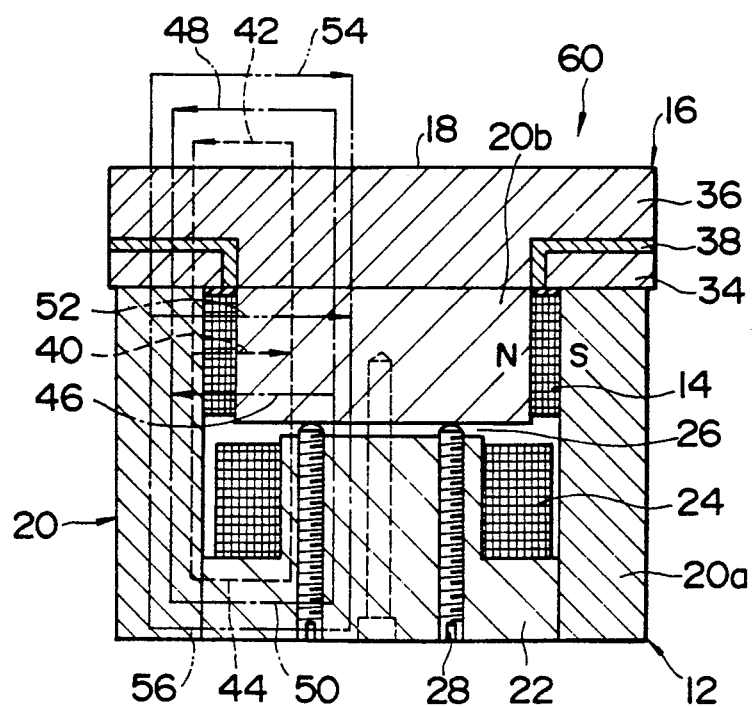

The iron core 22 may be placed upside down, as in a magnetic holding device 58 shown in FIG. 3. The magnetic cavity 26 may be adjusted by displacing the iron core 22 relative to the housing 20, as in a magnetic holding device 60 shown in FIG. 4. In the magnetic holding device embodiment shown in FIG. 4, the permanent magnet 14 is disposed between the cylindrical portion 20a and the yoke portion 20b of the housing 20.

Figure 5:
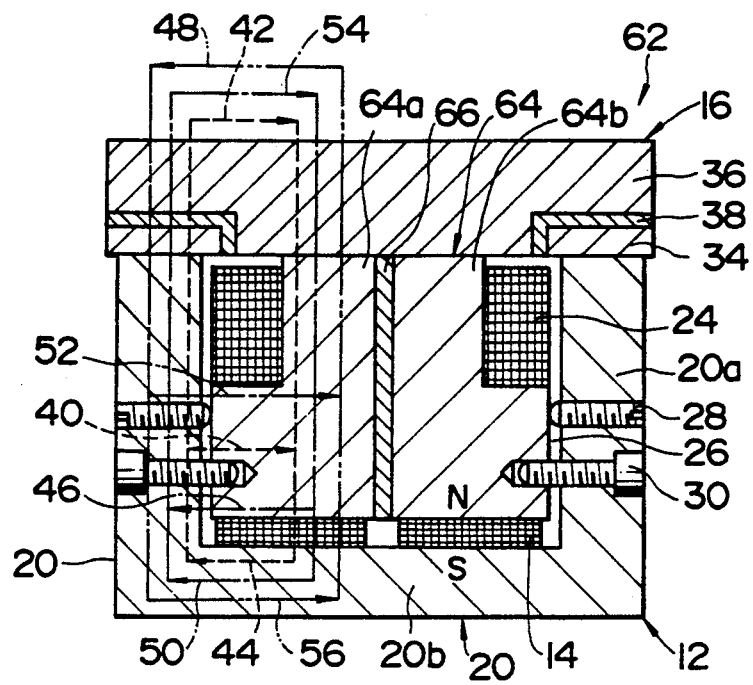

In a magnetic holding device 62 shown in FIG. 5, an iron core 64 is divided into two iron core members 64a, 64b in a width direction of the housing 20. A non-magnetic elastic member 66 like a rubber is disposed to form the magnetic cavity 26 between the cylindrical portion 20a of the housing 20 and each of the iron core members 64a, 64b.

The size of the magnetic cavity 26 in the magnetic holding device 62 may be adjusted by a plurality of screws 28 used as a stopper and screwed in the cylindrical portion 20a of the housing 20 and a plurality of screws 30 screwed in the iron core member 64a or 64b. Each permanent magnet 14 is also placed, displaceably with respect to the housing 20 together with the iron core member, between the yoke portion 20b of the housing 20 and the iron core member 64a or 64b.

Both the iron core 22 and the exciting coil 24 in the magnetic holding device 62 are sized such that the iron core 22 may be displaced at the inside of the exciting coil 24.

Figure 6:
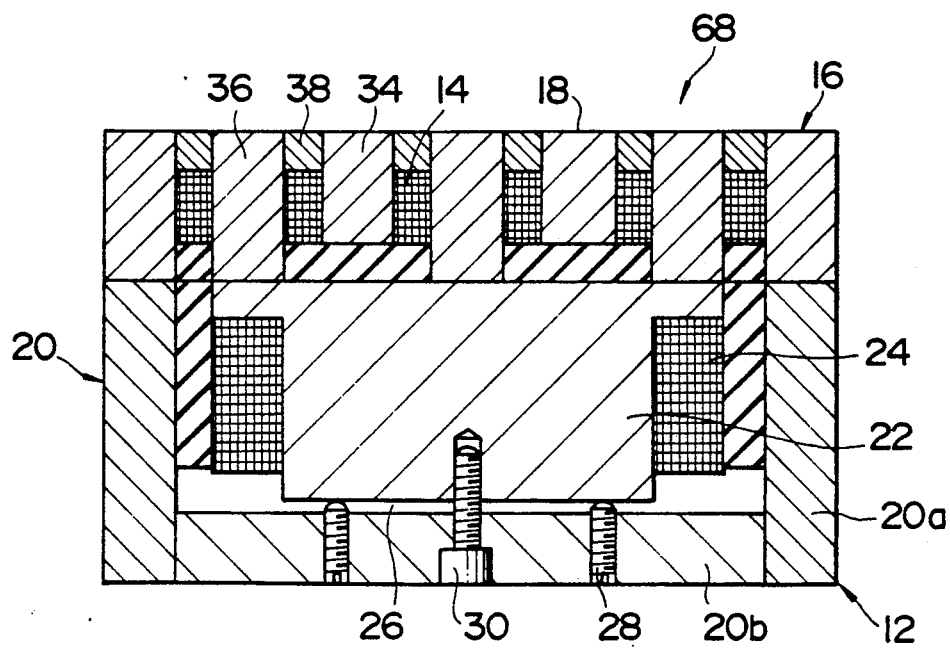
FIG. 6 is a sectional view similar to FIG. 1, showing a further embodiment of the magnetic holding device.

Each permanent magnet 14 may be provided in the face plate 16, as in a magnetic holding device 68 shown in FIG. 6.

In the magnetic holding device 68 shown in FIG. 6, each permanent magnet 14 is provided at a location between the first and second pole pieces 34, 36 and at the bottom of the spacer 38.

A magnetic pole surface of each permanent magnet 14 (e.g. S) is in contact with the first pole piece 34 at one side thereof, and with the second pole piece 36, at the other side.

The magnetic cavity 26 is formed between the yoke portion 20b of the housing 20 and the iron core 22. Therefore, in the magnetic holding device 68, when the exciting current is not supplied to the exciting coil 24, the first exciting current is supplied or the second exciting current is supplied, the respective magnetic fluxes are the same as those in the magnetic holding devices 58 and 60 shown in FIGS. 3 and 4, respectively.

Figure 7:
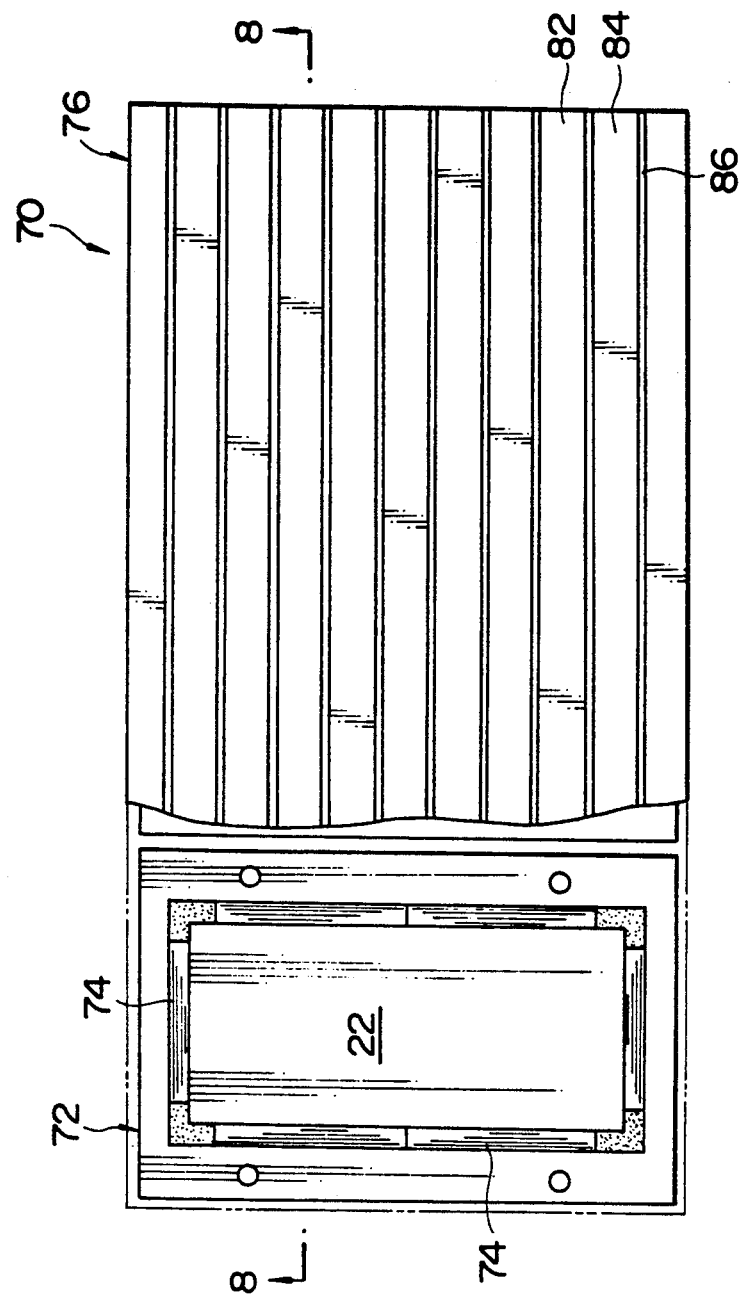
FIG. 7 is a sectional view showing a still further embodiment of the magnetic holding device.
Figure 8:
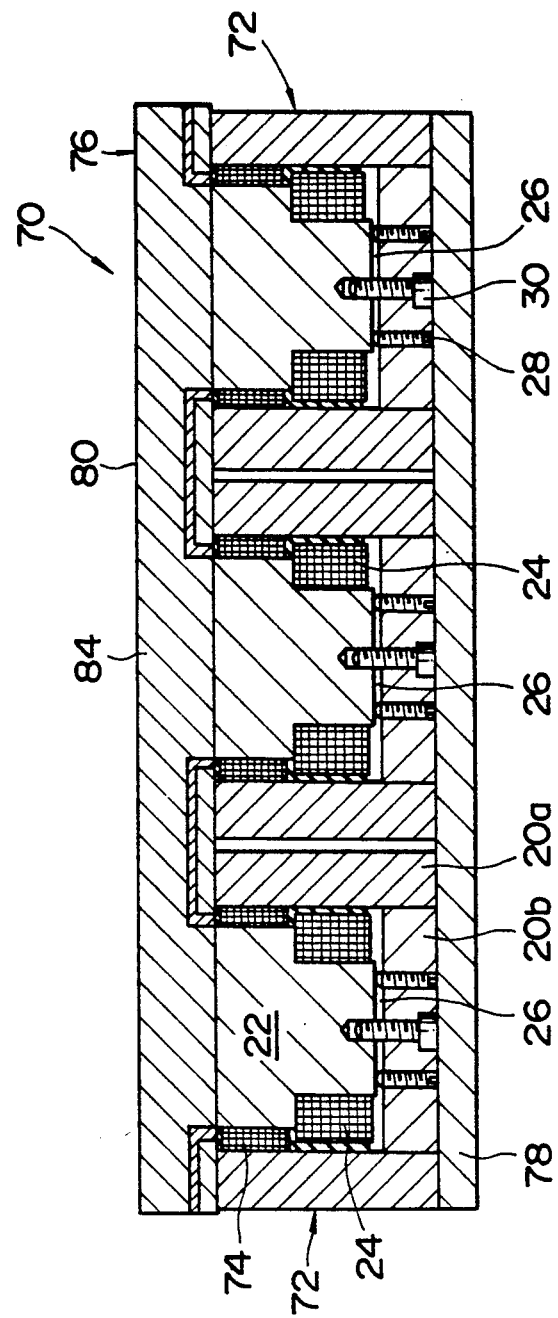
FIG. 8 is a sectional view taken along the line 8—8 of FIG. 7.

A magnetic holding device 70 shown in FIGS. 7 and 8 includes a plurality of electromagnet assemblies 72; a plurality of permanent magnets 74 arranged in the electromagnet assemblies; one common face plate 76 for the electromagnet assemblies 72; and a flat plate-like base 78 for mutually connecting the electromagnet assemblies 72. The magnetic substance is held on a holding surface 80 of the face plate 76 when the holding surface 80 is maintained in an excited state by cooperation with the permanent magnets 74 and the electromagnet assemblies 72. However, the magnetic substance is released from the holding surface 80 when a holding surface 80 is maintained in an unexcited state.

Each electromagnet assembly 72 is shown as similar to the electromagnet assembly 12 of the magnetic holding device 58 in FIG. 3 embodiment, but may be the electromagnet assembly of another magnetic holding device.

Similar to the face plate 16, the face plate 76 is provided with a plurality of elongate first and second pole pieces 82, 84 placed alternately and in a parallel relationship and a spacer 86 made of non-magnetic material and placed between the adjacent first and second pole pieces 82, 84. The face plate 76 is attached to the housing 20 of each electromagnet assembly 72 through a plurality of bolts (not shown).

Each first pole piece 82 is magnetically connected to the cylindrical portion 20a of the housing 20 of each electromagnet assembly 72 at both ends thereof, but it is magnetically insulated from the iron core 22. On the other hand, each second pole piece 84 is magnetically connected to the iron core 22 of each electromagnet assembly 72 at the central portion, but it is magnetically insulated from the cylindrical portion 20a of the housing 20.

In the magnetic holding device 70, the number of the electromagnet assemblies 72 is determined with regard to the size of the face plate 76.

In the magnetic holding device 70, the holding surface 80 is maintained in a weakly excited state by the permanent magnet 74, when an exciting current is not supplied to the exciting coil 24 of each electromagnet assembly 72. On the other hand, the holding surface 80 ia maintained in an excited state when the first exciting current is supplied to the exciting coil 24 of each electromagnet assembly 72. In addition, the holding surface 80 is maintained in an unexcited state when the second exciting current is supplied to the exciting coil 24 of each electromagnet assembly 72.

According to the magnetic holding device 70, it is possible to adjust the magnetic cavity of each electromagnet assembly 72, permitting electromagnet assembly 72 standardization. Furthermore maintenance and management the electromagnet assemblies 72 are simplified, and a number of electromagnet assemblies 72 may be prepared in advance.

FIGS. 9 through 16 show various preferred embodiments of a magnetic holding device of the present invention, in which the size of the magnetic cavity cannot be adjusted after assembly.

Figure 9:
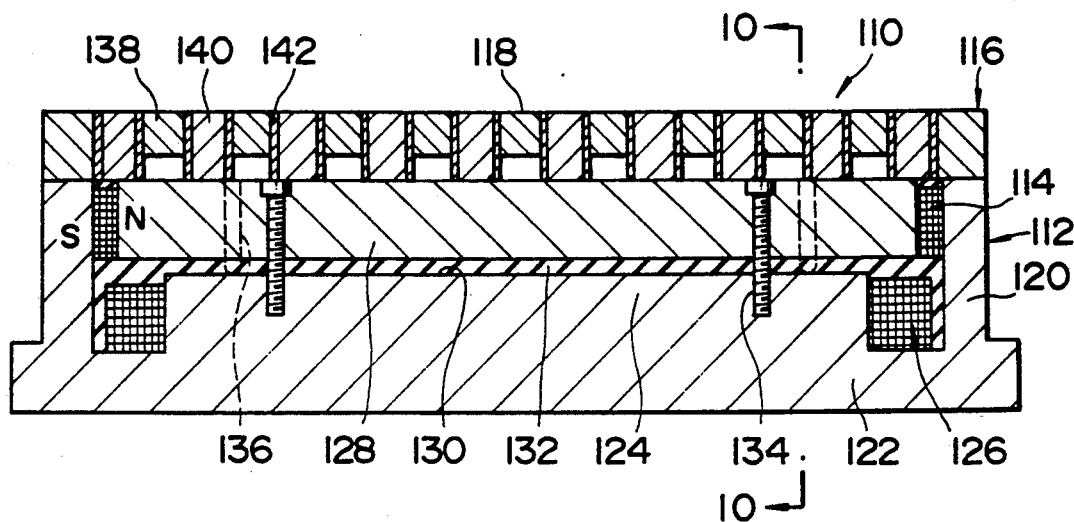
FIG. 9 is a sectional view of a preferred embodiment of another magnetic holding device according to the present invention.
Figure 10:
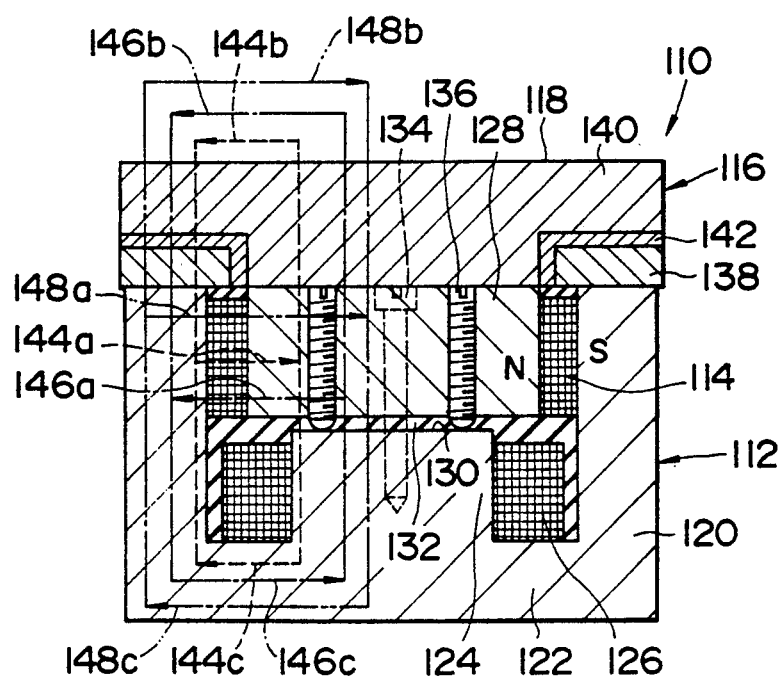
FIG. 10 is an enlarged sectional view taken along the line 10—10 of FIG. 9.

In FIGS. 9 and 10, a magnetic holding device 110 includes an electromagnet assembly 112; a plurality of permanent magnets 114 disposed in the electromagnet assembly, and a face plate 116. The magnetic substance is held on a holding surface 118 of the face plate 116 when the holding surface 118 is maintained an excited state by cooperation with the electromagnet assembly 112 and the permanent magnets 114, while the magnetic substance is released from the holding surface 118 when the holding surface 118 is maintained in an unexcited state.

The electromagnet assembly 112 is provided with a quadrangle cylindrical housing 120; a first yoke 122 placed to close one end of the housing, an iron core 124 made of a ferromagnetic material and placed within a space formed by the housing 120 and the first yoke 122; exciting coil 126 surrounding the iron core 124; and a second yoke 128 placed at the other end of the housing 120.

The housing 120, the first yoke 122 and the iron core 124 are integrally formed of a ferromagnetic material. The second yoke 128 is disposed in the housing 120 at a location spaced apart from the internal surface of the housing 120 to form a magnetic cavity 130 with the iron core 124. The magnetic cavity 130 is filled with non-magnetic material 132 such as solder and synthetic resins.

The iron core 124 is affixed with a plurality of screws 134 passing through the second yoke 128 and made of non-magnetic material the second yoke 128 is affixed with a plurality of screws 136 brought into contact with the iron core 124 and made of non-magnetic material.

The permanent magnet 114 is made of a permanent magnet material with high coercivity such as a ferrite magnet, and a rare earth magnet. The permanent magnet 114 disposed between the housing 120 and the second yoke 128. The permanent magnet 114 is magnetized in the direction perpendicular to the axis of the housing 120.

For example, the permanent magnet 114 may be magnetized as illustrated in FIG. 10, with the side of the housing 120 as S and that of the second yoke 128 as N, but the permanent magnet 14 may be also magnetized oppositely. The magnetic pole face of the permanent magnet 114 is in contact with both the housing 120 and the second yoke 128.

The relative position of the housing 120, the first yoke 122, the iron core 124, the second yoke 128 and the permanent magnet 114 is maintained by non-magnetic material 132 filling the internal space of the housing 120. The magnetic cavity 130 is also maintained by cooperation with the non-magnetic material 132 and the screws 134, 136.

The face plate 116 is provided with a plurality of elongate first and second pole pieces 138, 140 that as placed alternately and in a parallel relationship and a spacer 142 made if non-magnetic material and placed between the adjacent first and second pole pieces 138, 140. The face plate 116 is affixed to the housing 120 through a plurality of bolts (not shown).

Each first pole piece 138 is magnetically connected to the housing 120 at both ends in the longitudinal direction, but it is magnetically insulated from the second yoke 128. On the other hand, each second pole piece 140 is magnetically connected to the second yoke 128 at the central portion, but it is also magnetically insulated from the housing 120.

Each first pole piece 138 is actually brought into contact with a pair of wall portions corresponding to the housing 120. For this reason, the other pair of wall portions corresponding to the housing 120 may be made of non-magnetic material.

The holding surface 118 which holds a magnetic substance is defined by the first and second pole pieces 138, 140 and the spacer 142.

The magnetic flux of the permanent magnet 114 passes in the direction shown by dotted arrow lines 144a, 144b and 144c in FIG. 10, when an exciting current is not supplied to the exciting coil 126. The magnetic flux 144a is the total flux of the permanent magnet 114 in the illustrated condition. The magnetic fluxes 144a, 144b and 144c are related as follows:

$$A144a = A144b + A144c,$$

wherein the respective magnetic flux quantities are defined as A144a, A144b and A144c.

The magnetic flux 144a of the permanent magnet 114 enters the second yoke 128 from the N pole of the permanent magnet 114, and is divided into magnetic fluxes 144b and 144c. The magnetic flux 144b passes through the second yoke 128, the face plate 116, the holding surface 118, the face plate 116 and the housing 120, meets with the magnetic flux 144c at the housing 120 and returns to the S pole of the permanent magnet 114. The magnetic flux 144c is a magnetic leakage flux passing through the second yoke 128, the magnetic cavity 130, the iron core 124, the first yoke 122 and the housing 120, and does not pass through the magnetic substance. Therefore, the holding surface 118 is maintained in a weakly excited state by the magnetic flux 144b.

The first exciting current is supplied to the exciting coil 126 when the holding surface 118 is maintained in an excited state. For this reason, the magnetic fluxes 146a, 146b and 146c shown by one point dotted lines in FIG. 10 are generated by the exciting coil 126. The magnetic fluxes 146a, 146b and 146c are:

$$B146c = B146a + B146b,$$

wherein the respective magnetic flux quantities are defined as B146a, B146b and B146c.

The magnetic flux passing through the magnetic cavity 130 is a synthesized magnetic flux of the magnetic flux 144c generated by the permanent magnet 114 and the magnetic flux 146c generated by the exciting coil 126. Since the magnetic fluxes 144c and 146c are opposite in direction and of equal absolute value, they are mutually prevented from passing through the magnetic cavity 130.

On the other hand, the magnetic fluxes passing through the holding surface 118 are the magnetic fluxes 114b, 146b generated by the permanent magnet 114 and the exciting coil 126, respectively. Since the direction of the magnetic fluxes 144b, 146b is the same, the sum of the magnetic fluxes 144b, 146b passes through the holding surface 118. For this reason, the holding surface 118 is maintained in a strongly excited state, and the magnetic substance is held firmly on the holding surface 118.

When the holding surface 118 is maintained in an unexcited state, a second exciting current having a polarity opposite to that of the first exciting current is supplied to the exciting coil 126. Therefore, the magnetic fluxes 148a, 148b and 148c shown by two point dotted lines in FIG. 10 are generated by the exciting coil 126. The directions of the magnetic fluxes 148a, 148b and 148c are opposite to those of the magnetic fluxes 146a, 146b and 146c shown by one point dotted lines in FIG. 10, respectively. The magnetic fluxes 148a, 148b and 148c are related as follows:

$$C148c = C148a + C148b,$$

wherein the respective magnetic flux quantities are defined as C148a, 148b and C148c.

The magnetic fluxes passing through the second yoke 128, the face plate 116, the holding surface 118, the face plate 116 and the housing 120 are the magnetic flux 144b generated by the permanent magnet 114 and the magnetic flux 148b generated by the exciting coil 126, respectively the magnetic fluxes 144b, 148b are opposite in direction equal in absolute value. The holding surface 118 is therefore maintained in an unexcited state, and the magnetic substance is absolutely released from the holding surface 118.

The magnetic flux of the permanent magnet 114 is prevented from passing through the magnetic cavity 130 when the holding surface 118 is maintained in an excited state. However, this magnetic flux is also prevented from passing through the holding surface 118 when the holding surface 118 is maintained in an unexcited state.

According to the magnetic holding device 110, the magnetic leakage flux passing through the magnetic cavity 130 when the holding surface 118 is maintained in an excited state can therefore be eliminated, and it is possible to make the magnetic resistance of the magnetic cavity 130 small. It is also possible to lessen the built-in quantity of the permanent magnet 114 into the device and the magnetomotive force generated by the exciting coil 126. As a result, the exciting current of the exciting coil 126 can be lessened.

In the magnetic holding device 110, before the non-magnetic material 132 is placed in the space of the housing 120, the size of the magnetic cavity 130 can be varied by displacing the second yoke 128 relative to the iron core 124 through the screws 134, 136. The magnetic resistance value of the magnetic cavity 130 is varied with the size thereof. As a result, the quantity of the magnetic flux at the holding surface 118 and the quantity of the magnetic flux passing through the magnetic cavity 130 vary.

Therefore, at assembly, for example, the size of the magnetic cavity 130 may be adjusted by the screws 134, 136 such that no magnetic leakage flux passes through the upper surfaces of the housing 120 and the second yoke 128 when the second exciting current supplied to the exciting coil 126. The non-magnetic material 132 is then placed in the space of the housing 120. Subsequently, the upper surface of the electromagnetic assembly 112 is ground, and, therefore, the face plate 116 can be ultimately mounted on the upper surface of the electromagnet assembly 112.

In this manner, as the size of the magnetic cavity may be adjusted by the screws 134, 136 and maintained in an adjusted condition. The size of the magnetic cavity 130 may therefore be adjusted accurately and easily.

In the magnetic holding device 110 shown in FIGS. 9 and 10, the second yoke 128 may be disposed indisplaceably relative to the housing 120, and both the first yoke 122 and the iron core 124 may be disposed displaceably relative to the housing 120 in the axial direction.

In this embodiment, the first yoke 122 is seperated from the housing 120 at a position corresponding to the inside surface of the housing 120, and also is magnetically connected to the housing 120. The screw 134 passes through the first yoke 122 and the iron core 124 and is screwed in the second yoke 128. The screw 136 is screwed in the first yoke 122 and the iron core 124 and is brought into contact with the lower surface of the second yoke 128.

Figure 11:
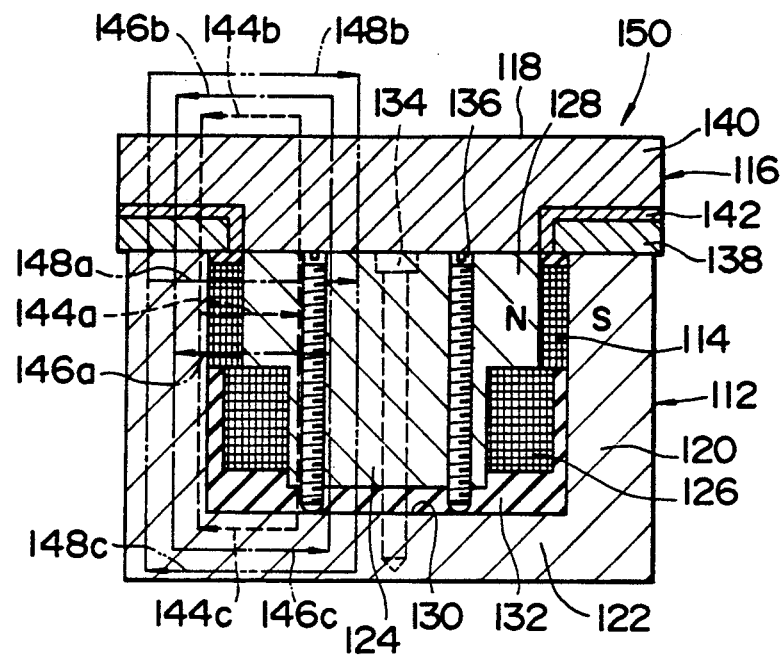
FIGS. 11, 12 and 13 are enlarged sectional views similar to FIG. 10, which shows other embodiments of another magnetic holding device.

In a magnetic holding device 150 shown in FIG. 11, the iron core 124 may be separated from the first yoke 122 to set the iron core 124 and the second yoke 128 integrally. The magnetic cavity 130 is formed by the first yoke 122 and the iron core 124. The screw 134 passes through the second yoke 128 and the iron core 124 and is screwed in the first yoke 122. The screw 136 is screwed in the second yoke 122 and the iron core 124 and is brought into contact with the first yoke 122.

In the magnetic holding device 150, the magnetic flux of the permanent magnet 114, the magnetic flux generated by the exciting coil 126 when the first exciting current is supplied to the exciting coil 126 and the magnetic flux generated by the exciting coil 126 when the second exciting current is supplied to the exciting coil 126 are illustrated using the same symbols as those in the preferred embodiment shown in FIG. 10.

For this reason, the holding surface 118 is kept in an excited state when the first exciting current is supplied to the exciting coil 126, since the magnetic fluxes 144b, 146b passing through the holding surface 118 are oriented in the same direction and the magnetic fluxes 144c, 146c passing through the magnetic cavity 130 are oriented in opposite directions. In addition, the holding surface 118 is kept in an unexcited state when the second exciting current is supplied to the exciting coil 126, since the magnetic fluxes 144b, 148b passing through the holding surface 118 are oriented in opposite directions and the magnetic fluxes 144c, 148c passing through the magnetic cavity 130 are oriented in the same direction.

In the magnetic holding device 150, the iron core 124 and the second yoke 128 may also be disposed indisplaceably relative to the housing 120, and the first yoke 122 may be disposed axially displaceable relative to the housing 120. In this embodiment, the first yoke 122 is separated from the housing 120 at the position corresponding to the internal surface of the housing 120, and is magnetically connected to the housing 120.

The screw 134 passes through the second yoke 128 and the iron core 124 and is screwed in the first yoke 122. The screw 136 is screwed in the second yoke 128 and the iron core 124 and is brought into contact with the upper surface of the first yoke 122.

Figure 12:
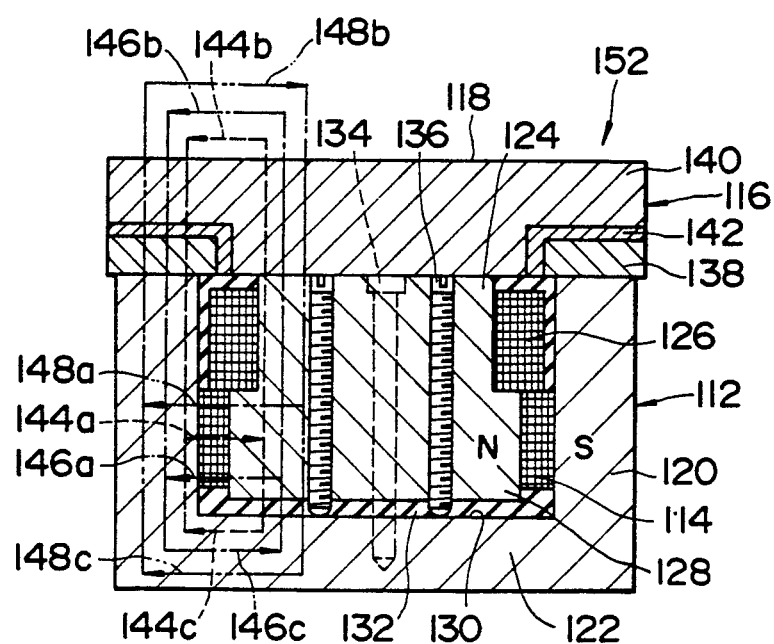

In a magnetic holding device 152 shown in FIG. 12, the iron core 124 and the second yoke 128 may be oriented upside down.

In case of the magnetic holding device 152, the iron core 124 and the second yoke 128 may also be disposed indisplaceably relative to the housing 120, and the first yoke 122 may be disposed displaceably relative to the housing 120 in the axial direction.

Figure 13:
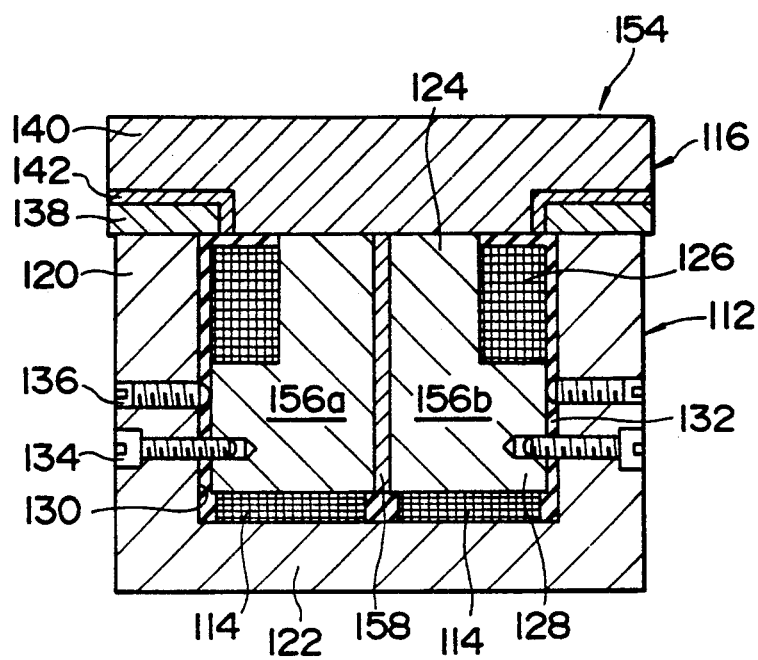

In a magnetic holding device 154 shown in FIG. 13, the iron core 124 and the second yoke 128 are set integrally, and the integral member is divided into a pair of members 156a, 156b in the width direction of the housing 120. A non-magnetic elastic member 158 like a rubber is disposed between the members 156a, 156b. The magnetic cavity 130 is formed between the housing 120 and each member 156a or 156b.

In the magnetic holding device 154, each permanent magnet 114 is disposed, at a location between the first yoke 122 and the member 156a or 156b, displaceably relative to the housing 120 and the first yoke 122 with the corresponding members. The iron core 124 and the exciting coil 126 are sized such that the iron core 124 may be displaced at the inside of the exciting coil 126. The screw 134 passes through the housing 120 and is screwed in the member 156a or 156b. The screw 136 is screwed in the housing 120 and is brought into contact with the member 156a or 156b.

Figure 14:
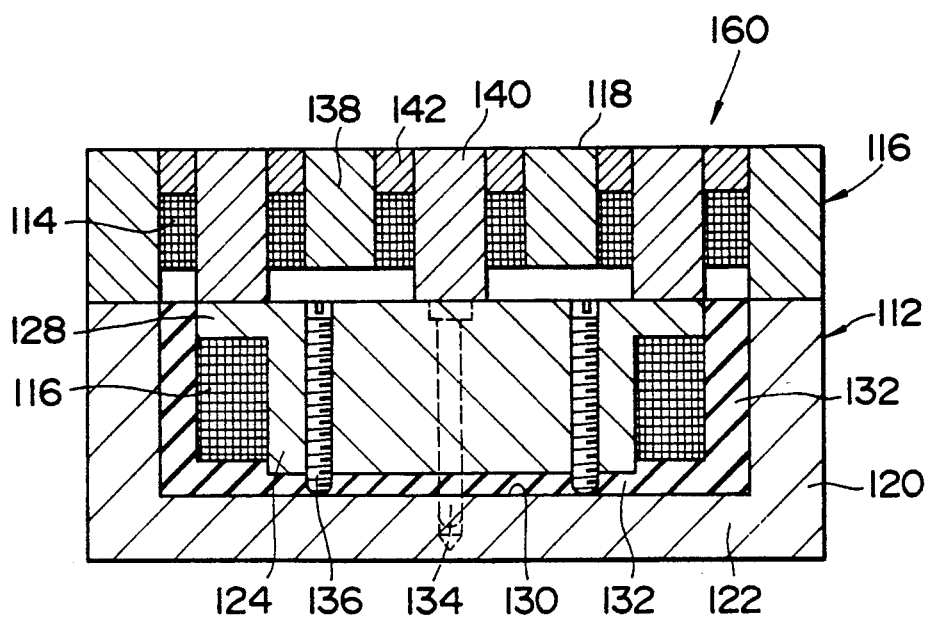
FIG. 14 is a sectional view similar to FIG. 9, showing a further embodiment of another magnetic holding device.

Each permanent magnet 114 may be placed in the face plate 116 as shown in a magnetic holding device 160 of FIG. 14.

In the magnetic holding device 160 shown in FIG. 14, each permanent magnet 114 is disposed between the first and second pole pieces 138, 140 and at the bottom of the spacer 142. One magnetic pole face of each permanent magnet 114 (e.g., S) is brought into contact with the first pole piece 138, and the other magnetic pole face is in contact with the second pole piece 140.

The magnetic cavity 130 is formed between the first yoke 122 and the iron core 124. Therefore, in the magnetic holding device 160, when the exciting current is not supplied to the exciting coil 126, the first exciting current is supplied or the second exciting current is supplied, the respective magnetic fluxes are the same as those in the magnetic holding devices 110, 150 shown in FIGS. 10, and 11.

Figure 15:
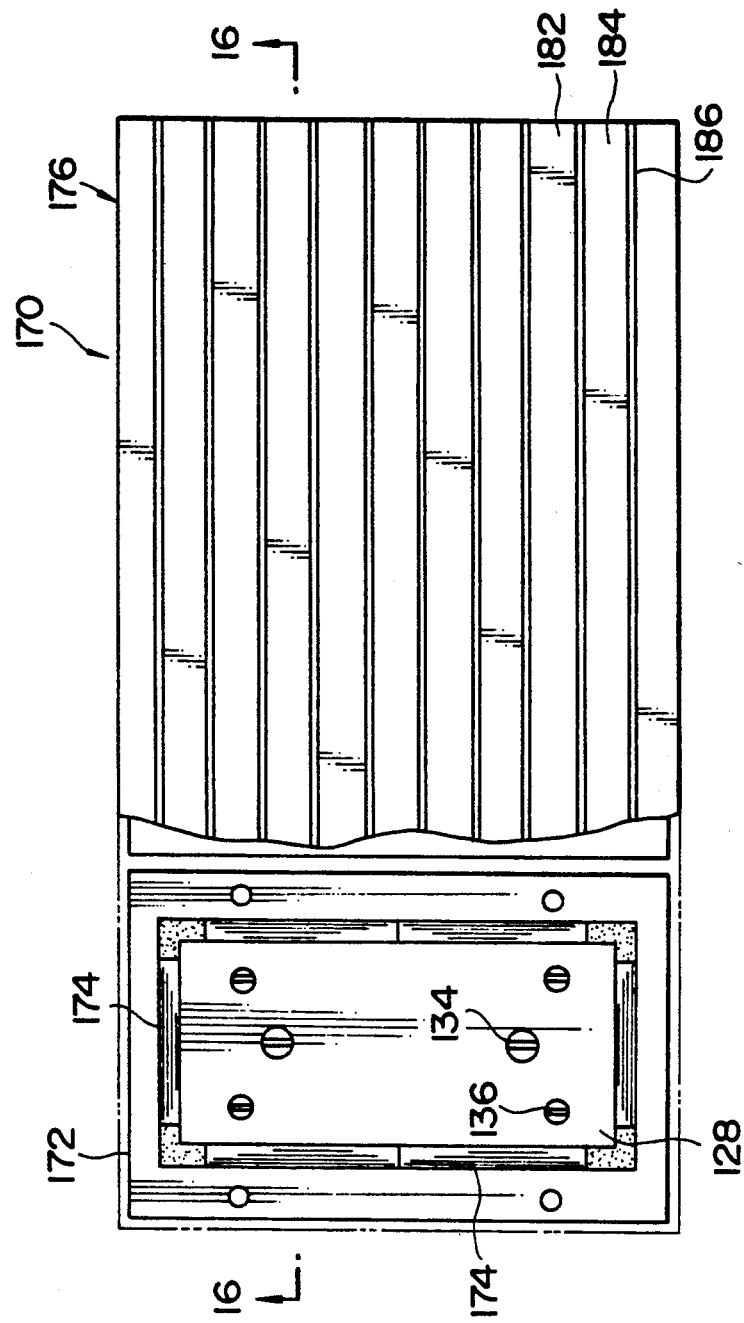
FIG. 15 is a view showing a still further embodiment of another magnetic holding device.
Figure 16:
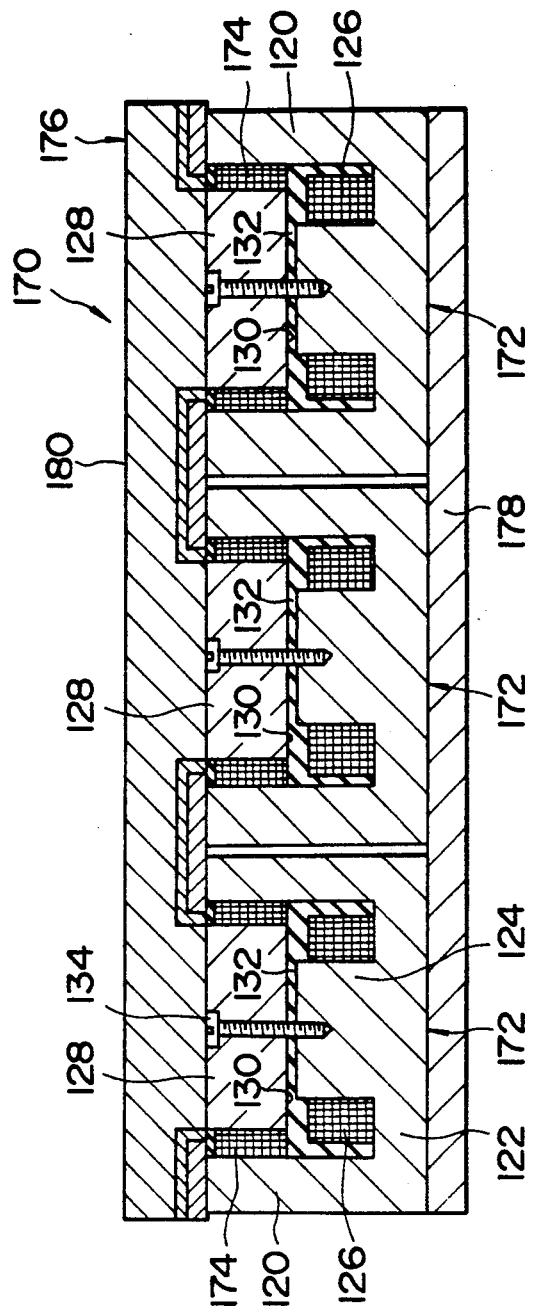
FIG. 16 is a sectional view taken along the line 16—16 of FIG. 15.

A magnetic holding device 170 shown in FIGS. 15 and 16 includes a plurality of electromagnet assemblies 172; a plurality of permanent magnets 174 arranged in each electromagnet assembly; a common face plate 176 for the electromagnet assemblies 172; and a flat platelike base 178 for mutually connecting the electromagnet assemblies 172. A magnetic substance is held on a holding surface 180 of the face plate 176 when the holding surface 180 is maintained in an excited state by cooperation with the electromagnet assemblies 172 and the permanent magnet 174. However, the magnetic substance is released from the holding surface 180 when the holding surface 180 is maintained in an unexcited state.

Each electromagnet assembly 172 in the illustrated embodiment is similar to the electromagnet assembly 112 of the magnetic holding device shown in FIGS. 9 and 10, but may be the electromagnet assemblies of another magnetic holding device.

Similar to the face plate 116, the face plate 176 is provided with a plurality of elongate first and second pole, pieces 182, 184 placed alternately and in a parallel relationship and a spacer 186 made of non-magnetic material and adjacent disposed between the first and second pole pieces 182, 184. The face plate 176 is also attached to the housing 120 of each electromagnet assembly 172 through a plurality of bolts (not shown).

Each first pole piece 182 is magnetically connected to the housing 120 of each electromagnet assembly 172 at the both ends thereof, but it is magnetically insulated from the second yoke 128. On the other hand, each second pole piece 184 is magnetically connected to the second yoke 128 of each electromagnet assembly 172 at the central portion, but it is magnetically insulated from the housing 120.

In the magnetic holding device 170, the number of the electromagnet assemblies 172 is determined with regard to size of the face plate 176.

In the magnetic holding device 170, the holding surface 180 is maintained in a weakly excited state by the permanent magnet 174, when the exciting current is not supplied to the exciting coil 126 of each electromagnet assembly 172. On the contrary, the holding surface 180 is maintained in an excited state when the first exciting current is supplied to the exciting coil 126 of each electromagnet assembly 172. In addition, the holding surface 180 is maintained in an unexcited state when the second exciting current is supplied to the exciting coil 126 of each electromagnet assembly 172.

According to the magnetic holding device 170, the magnetic cavity of each electromagnet assembly 172 is adjustable, permitting electromagnet assembly 172 standardization. Furthermore, maintenance and management the electromagnet assemblies 172 are simplified, and it is possible to prepare a large number of electromagnet assemblies 172 in advance.

The present invention may also be applied to a magnetic holding device in which the exciting current is supplied to the exciting coil only when the holding surface is to be maintained in an unexcited state. In this case, it is preferable that the magnetic cavity is of a size, such that most of the magnetic flux from the permanent magnet passes through the holding surface without passing through the magnetic cavity when the holding surface is to be maintained in an excited state.

Furthermore, the present invention may also applied a magnetic holding device in which no face plate is used. In this case, the holding surface is defined by either the housing and the iron core or the housing and the second yoke. The magnetic cavity adjusting operation at assembly is simplified if a plurality of both types of the screws 134, 136 are used. However, only one type of screws may be used.

What is claimed is:

1. A magnetic holding device comprising:
   at least one electromagnet assembly for selectively switching a holding portion for a magnetic substance into an excited state and an unexcited state; and
   a permanent magnet for selectively keeping said holding portion in an excited state or an unexcited state in cooperation with said at least one electromagnet assembly,
   wherein said at least one electromagnet assembly comprises: a housing provided with a cylindrical portion and a yoke portion disposed at one end of said cylindrical portion and magnetically connected to said cylindrical portion; a magnetic cavity acting as a magnetic leakage path for a magnetic flux from said permanent magnet when said holding portion is maintained in an unexcited state; an iron core disposed within said housing; an exciting coil for generating a magnetic field that acts on said iron core and selectively switches said holding portion into an excited state or an unexcited state in cooperation with said permanent magnet; and adjustment means for adjusting the size of said magnetic cavity so that a magnetic flux from said permanent magnet may pass through said magnetic cavity when said holding portion is to be maintained in an unexcited state.

2. A magnetic holding device according to claim 1, wherein either said yoke portion or said iron core is disposed movably with respect to the other thereof to define said magnetic cavity between said yoke portion and said iron core, and is also displaceable by said adjustment means to adjust said magnetic cavity.

3. A magnetic holding device according to claim 2, wherein said yoke portion is disposed displaceably relative to said cylindrical portion and said iron core, and said iron core is disposed indisplaceably relative to said cylindrical portion.

4. A magnetic holding device according to claim 2, wherein said iron core is disposed displaceably relative to said cylindrical portion and said yoke portion, and said yoke portion is disposed indisplaceably relative to said cylindrical portion.

5. A magnetic holding device according to claim 2, wherein said holding portion is defined by said cylindrical portion and said iron core, and said permanent magnet is disposed between said cylindrical portion and said iron core.

6. A magnetic holding device according to claim 2, wherein said holding portion is defined by said cylindrical portion and said yoke portion, and said permanent magnet is disposed between said cylindrical portion and said yoke portion.

7. A magnetic holding device according to claim 1, further comprising a face plate magnetically connected to said at least one electromagnet assembly and defining said holding portion, said permanent magnet being disposed in said at least one electromagnet assembly or in said face plate.

8. A magnetic holding device according to claim 1, further comprising a face plate magnetically connected to a plurality of said electromagnet assemblies and defining said holding portion, said permanent magnet being disposed in said electromagnet assemblies or in said face plate.

9. A magnetic holding device according to claim 1, wherein said yoke portion is provided with a first yoke magnetically connected to the housing and a second yoke arranged within said housing, and wherein said second yoke and said iron core, said first yoke and said iron core, said first yoke and said second yoke or said cylindrical portion and said second yoke form said magnetic cavity in cooperation with each other.

10. A magnetic holding device according to claim 1, wherein said magnetic cavity is formed by two members, wherein said adjustment means includes a plurality of screws passing through on of said two members forming said magnetic cavity and screwed in the other of said two members, and wherein said two members are connected to each other by using said screws.

11. A magnetic holding device according to claim 10, wherein a non-magnetic material is arranged in said magnetic cavity.

12. A magnetic holding device according to claim 1, wherein said magnetic cavity if formed by two members, wherein said adjustment means includes a plurality of screws screwed in one of said two members forming said magnetic cavity and brought into contact with the other of said two members, and wherein said two members are connected to each other using said screws.

13. A magnetic holding device according to claim 12, wherein a non-magnetic material is arranged in said magnetic cavity.

* * * * *

UNITED STATES PATENT AND TRADEMARK OFFICE
CERTIFICATE OF CORRECTION

PATENT NO. : 5,243,314

DATED : September 7, 1993

INVENTOR(S) : Masaaki Maruyama

It is certified that error appears in the above-identified patent and that said Letters Patent is hereby corrected as shown below:

Column 1, line 18, after "a" delete "the".

Column 1, line 32, after "state" insert --, however--.

Column 1, line 62, after "state" insert --;--.

Column 2, line 5, after "device" insert --,--.

Column 2, line 14, after "displaceably" insert --with respect--.

Column 2, line 40, after "may" insert --,--.

Column 2, line 40, after "therefore" insert --,--.

Column 3, line 59, after "20a" insert --,--.

Column 4, line 15, change "rear" to --rare--.

Column 4, line 21, after "2" insert --,--.

Column 5, line 24, after "wherein" insert --the--.

Column 5, line 34, after "holding" delete ",".

Column 5, line 34, change "46" to --48--.

Column 5, line 60, after "magnetic" delete ",".

UNITED STATES PATENT AND TRADEMARK OFFICE
CERTIFICATE OF CORRECTION

PATENT NO. : 5,243,314            Page 2 of 4

DATED : September 7, 1993

INVENTOR(S) : Masaaki Maruyama

It is certified that error appears in the above-identified patent and that said Letters Patent is hereby corrected as shown below:

Column 5, line 63, after "valves." delete "For this reason,".

Column 5, line 63, change "the" to --The--.

Column 5, line 64, change "maintain" to --therefore maintained--.

Column 6, line 1, change "maintain" to --maintained--.

Column 6, line 4, after "surface" insert --18--.

Column 6, line 4, change "kept" to --maintained--.

Column 7, line 9, after "e.g." insert --,--.

Column 7, line 10, after "36" delete ",".

Column 7, line 35, after "3" delete "embodiment,".

Column 7, line 41, change "non-magnetic" to --nonmagnetic--.

Column 8, line 5, after "management" insert --of--.

Column 8, line 15, change "," to --112;--.

Column 8, line 17, after "maintained" insert --in--.

Column 8, line 25, change "," to --120;--.

UNITED STATES PATENT AND TRADEMARK OFFICE
CERTIFICATE OF CORRECTION

PATENT NO. : 5,243,314

DATED : September 7, 1993

INVENTOR(S) : Masaaki Maruyama

It is certified that error appears in the above-identified patent and that said Letters Patent is hereby corrected as shown below:

Column 8, line 28, before "exciting" insert --an--.

Column 8, line 41, change "material the" to --material. The--.

Column 8, line 47, after "114" insert --is--.

Column 8, line 66, change "as" to --are--.

Column 10, lines 26 and 27, change "respectively the" to --respectively. The--.

Column 10, line 28, after "direction" insert --and--.

Column 10, line 64, after "current" insert --is--.

Column 11, line 3, delete "as".

Column 11, line 66, after "down" insert --with respect to the embodiment shown in Fig. 11--.

Column 12, line 61, after "pole" delete ",".

Column 12, line 62, change "non-magnetic" to --nonmagnetic--.

Column 12, line 63, after "and" delete "adjacent" and after "and", second occurence, insert --adjacent--.

UNITED STATES PATENT AND TRADEMARK OFFICE
CERTIFICATE OF CORRECTION

PATENT NO. : 5,243,314
DATED : September 7, 1993
INVENTOR(S) : Masaaki Maruyama

It is certified that error appears in the above-identified patent and that said Letters Patent is hereby corrected as shown below:

Column 13, line 9, after "to" insert --the--.

Column 13, line 24, after "management" insert --of--.

Column 13, line 36, after "also" insert --be--.

Column 14, line 51, change "on" to --one--.

Column 14, line 59, change "if" to --is--.

Abstract, line 7, after "The" delete "at".

Signed and Sealed this

Sixth Day of September, 1994

Attest:

BRUCE LEHMAN

Attesting Officer     Commissioner of Patents and Trademarks